United States Patent [19]
Asaoka et al.

[11] Patent Number: 5,633,740
[45] Date of Patent: May 27, 1997

[54] CHIRAL SMECTIC LIQUID CRYSTAL DEVICE HAVING AT LEAST ONE ORIENTATION FILM DIVIDED INTO REGIONS WITH DIFFERENT UNIAXIAL ALIGNING TREATMENT

[75] Inventors: Masanobu Asaoka, Yokohama; Hideaki Takao, Sagamihara; Makoto Kojima, Hino, all of Japan

[73] Assignee: Canon Kabushiki Kaisha, Tokyo, Japan

[21] Appl. No.: 240,476

[22] Filed: May 10, 1994

[30] Foreign Application Priority Data

May 10, 1993 [JP] Japan ........................... 5-131038
May 10, 1993 [JP] Japan ........................... 5-131039

[51] Int. Cl.[6] ................................................ G02F 1/1337
[52] U.S. Cl. ................................... 349/129; 349/133
[58] Field of Search ............................ 359/100, 75, 78, 359/76

[56] References Cited

U.S. PATENT DOCUMENTS

| | | | |
|---|---|---|---|
| 4,836,653 | 6/1989 | Yoshino et al. | 354/100 |
| 5,189,536 | 2/1993 | Hanyu et al. | 359/56 |
| 5,221,981 | 6/1993 | Kodera et al. | 359/76 |
| 5,321,537 | 6/1994 | Okada et al. | 359/100 |
| 5,347,381 | 9/1994 | Shinomiya et al. | 359/100 |

FOREIGN PATENT DOCUMENTS 4247429   9/1992   Japan .

*Primary Examiner*—William L. Sikes
*Assistant Examiner*—James A. Dudek
*Attorney, Agent, or Firm*—Fitzpatrick, Cella, Harper & Scinto

[57] ABSTRACT

A liquid crystal device is constituted by a pair of substrates disposed in parallel and each provided with a transparent electrode, and a chiral smectic liquid crystal disposed between the pair of substrates. At least one of the substrates is provided with a uniaxial alignment control film which have been rubbed in at least two different directions. Liquid crystal molecules may preferably form a pretilt angle of at least 5 degrees with respect to the alignment control film.

5 Claims, 9 Drawing Sheets

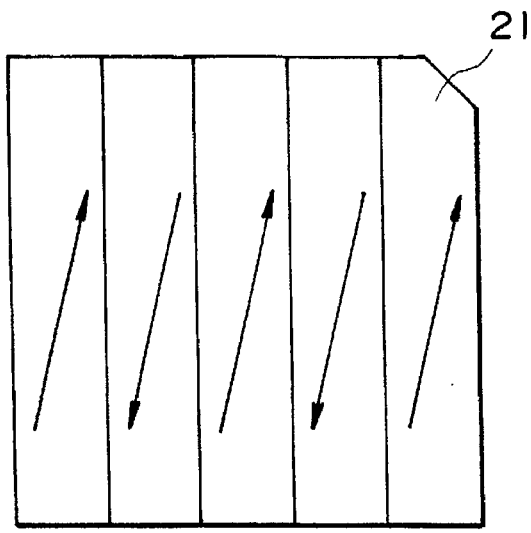
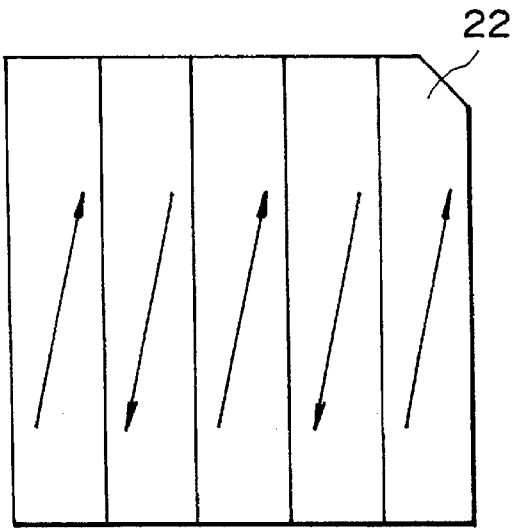
F I G. 2A  F I G. 2B
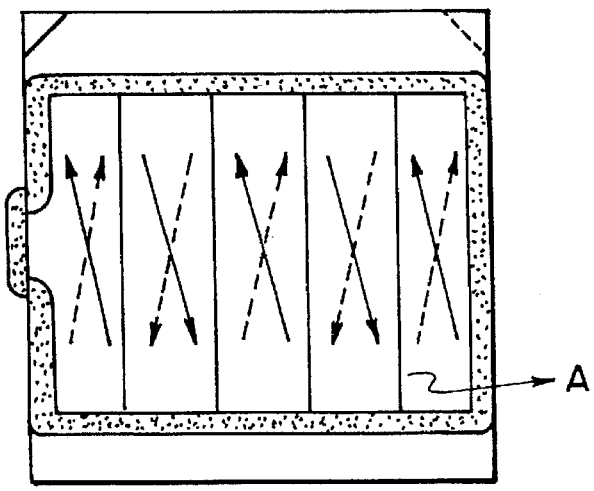
F I G. 2C

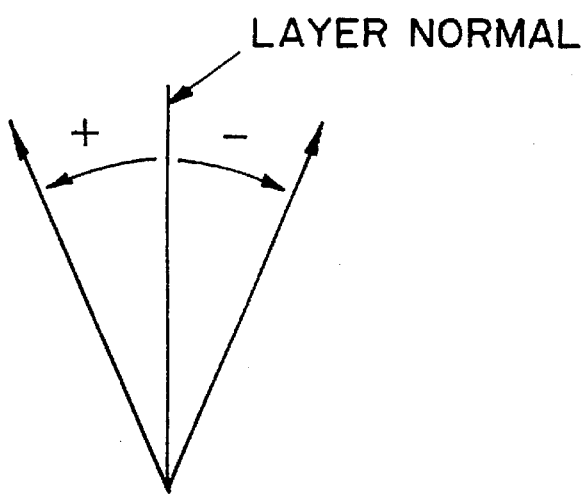
FIG. 3A
    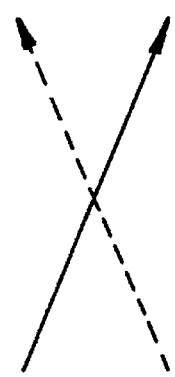    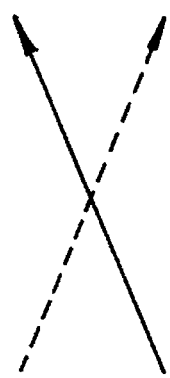
CROSS 0°        (+) CROSS        (−) CROSS
FIG. 3B        FIG. 3C        FIG. 3D

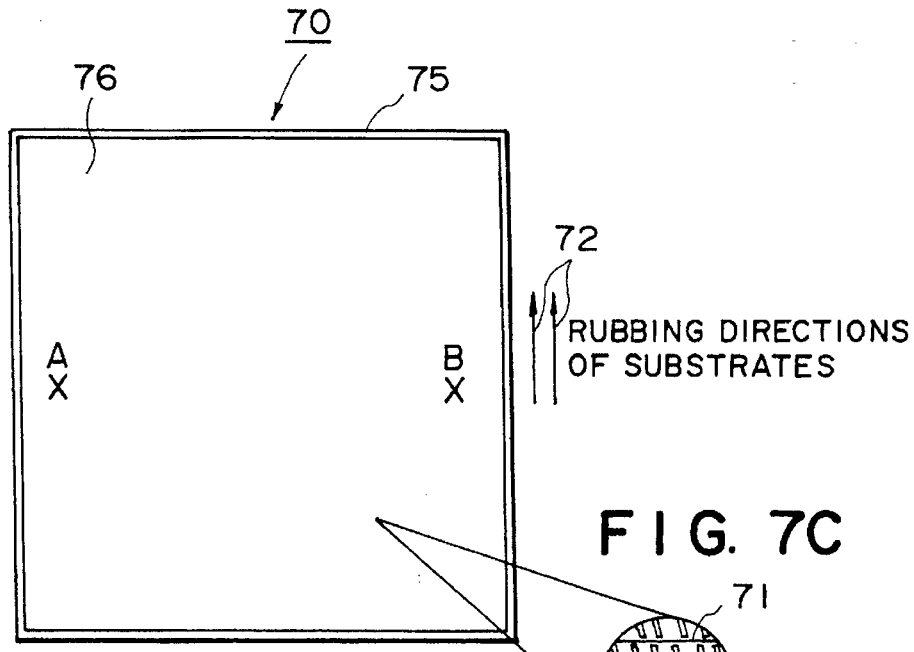
FIG. 7A
FIG. 7C
FIG. 7D
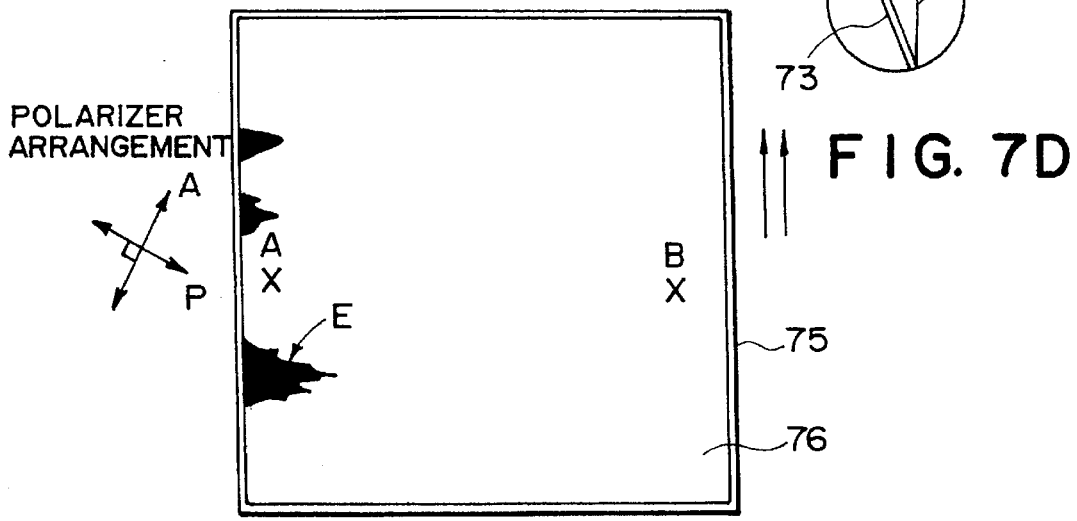
FIG. 7B

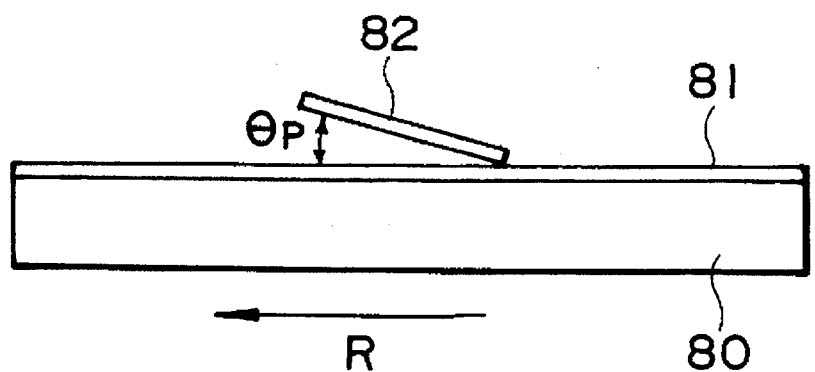
F I G. 8A
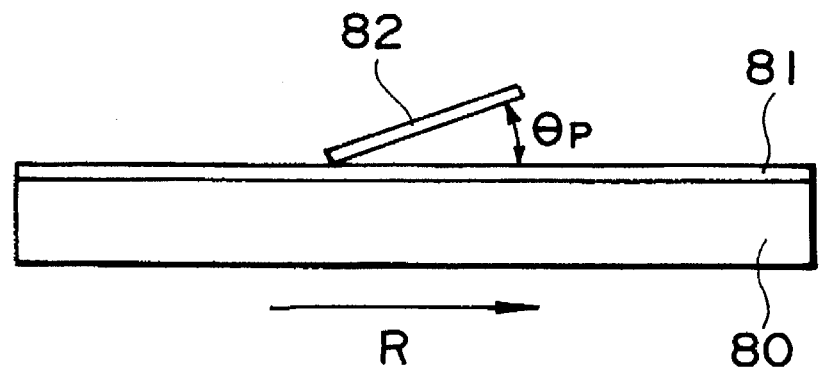
F I G. 8B

CHIRAL SMECTIC LIQUID CRYSTAL DEVICE HAVING AT LEAST ONE ORIENTATION FILM DIVIDED INTO REGIONS WITH DIFFERENT UNIAXIAL ALIGNING TREATMENT

FIELD OF THE INVENTION AND RELATED ART

The present invention relates to a liquid crystal device for use in a liquid crystal display apparatus, a liquid crystal-optical shutter, etc., more particularly to a liquid crystal device provided with improved display characteristics through improvement in alignment state of liquid crystal molecules.

In view of difficulties, such as complicated production steps and a narrow viewing characteristic, accompanying a conventional TN (twisted nematic)-type liquid crystal device, there has been proposed a type of liquid crystal device for controlling light transmission therethrough by utilizing a refractive index anisotropy of ferroelectric liquid crystal (sometimes abbreviated as "FLC") molecules in combination with a polarizer.

The FLC generally has chiral smectic C phase (SmC*) or H phase (SmH*) of a non-helical structure and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device and particularly to provide a large-area, high-resolution display.

A display device using FLC may generally be constituted by forming a liquid crystal cell including a pair of substrates (glass plates) disposed opposite to each other and having opposing surfaces each provided with transparent electrodes and subjected to an aligning treatment, and filling the cell with FLC. The FLC cell may be formed in a simple matrix structure as schematically illustrated in FIG. 9A (a sectional view) and FIG. 9B (a plan view of one substrate). Such an FLC cell has caused problems as described below.

A first one is that FLC molecules are perturbed to some extent in response to non-selection signals during a matrix drive. This can be confirmed by a phenomenon that a pixel supplied with non-selection signals shows an optical response accompanied with a fluctuation in transmitted light quantity in synchronism with the applied pulses of the non-selection signals. Such fluctuation or perturbation of liquid crystal molecules may be tolerable in a so-called splay alignment state (wherein liquid crystal molecular long axes are remarkably twisted in a direction perpendicular to and between a pair of substrates), if the liquid crystal molecules are not switched between stable states thereby, thus retaining displayed data even if some decrease in contrast is caused thereby. In a uniform alignment state (wherein liquid crystal molecules are substantially free from such a twist between a pair of substrates in a direction perpendicular to the substrates), however, such perturbation of liquid crystal molecules caused by repetitive application of non-selection signals can lead to movement of liquid crystal molecules in a smectic layer. This phenomenon will be described in some detail with reference to FIGS. 7A–7D.

FIG. 7A illustrates a state before voltage application, and FIG. 7B illustrates a state after voltage application, respectively, of a liquid crystal device (cell) 70. An FLC 76 is sealed within a sealing member 75 disposed at the periphery of the cell. In this cell, both substrates are provided with polyimide alignment films which are rubbed in upward parallel directions 72. As a result of the treatment, smectic layers 71 are formed in a direction perpendicular to the rubbing directions 72 (FIG. 7C).

If the cell thickness is reduced sufficiently to release the helical pitch, the FLC assumes two stable states. Now, all liquid crystal molecules 73 are placed in one of the two stable states as shown in FIG. 7C. This position is referred to as $+\theta$ with respect to a layer normal vector i (FIG. 7D). The other stable state exist at a position $-\theta$ which is symmetrical to the $+\theta$ position with respect to the layer normal vector i.

When liquid crystal molecules wholly placed in the state of $+\theta$ are supplied with an electric field (e.g., rectangular pulses of 10 Hz, $\pm 8V$), the liquid crystal molecules 73 start to move in a direction of from point A to point B in a smectic layer while retaining their inclination of $+\theta$ with respect to the layer normal i. As a result, if such an electric field is continually applied for a long period, the device causes a local change in cell thickness to finally result in parts E void of liquid crystal along the side of A, and the thickness near the side of B is larger than that near the side A to cause a locally yellowish tint thereat on the picture (yellowing). On the other hand, if liquid crystal molecules are placed in the state of $-\theta$, the liquid crystal molecules are moved in a direction of the side B to the side A in the smectic layer to result in liquid crystal velds along the side D.

Such a phenomenon can be caused in a relatively short period of 20–50 hours. The presence of the liquid crystal void E which is an electrooptically uncontrollable portion is of course not desirable in respect of display quality. Further, such a local change in cell thickness at points A and B will make the control of the entire liquid crystal panel difficult so that this phenomenon has posed a serious problem in an optical device using FLC.

In order to cope with the above problem, it has been proposed to form a plurality of regions so that rubbing directions are mutually reverse in adjacent regions (Japanese Laid-Open Patent Application (JP-A) 4-247429), but a sufficient solution has not been attained thereby.

As another problem of a chiral smectic liquid crystal device, it has been difficult to obtain a homogenous or uniform alignment over a large area and a stable alignment at a good reproducibility. As a result, the resultant liquid crystal device can cause an irregular display quality and is not sufficiently satisfactory.

Further, in case where a deterioration arising from twisted alignment is intended to be improved by an increased pretilt angle (angle formed by liquid crystal molecules with respect to a substrate surface), it is difficult to provide a uniform and stable alignment over a large area and a sufficiently satisfactory display quality.

SUMMARY OF THE INVENTION

An object of the present invention is to provide a liquid crystal device (panel) wherein a liquid crystal movement leading to a cell thickness irregularity, yellowing of occurrence of a poor controllability region is effectively suppressed.

Another object of the present invention is to provide a liquid crystal device ensuring a homogenous or uniform alignment over a large area and a stale alignment at a good reproducibility.

According to a first aspect of the present invention, there is provided a liquid crystal device, comprising: a pair of substrates disposed in parallel and each provided with a transparent electrode, and a chiral smectic liquid crystal disposed between the pair of substrates; wherein at least one of the substrates is provided with a uniaxial alignment control film which have been rubbed in at least two different directions, and liquid crystal molecules form a pretilt angle of at least 5 degrees with respect to the alignment control film. It is further preferred that the above-mentioned uniaxial treatment in a prescribed direction is performed after a uniaxial aligning treatment in a direction different from the prescribed direction.

According to another aspect of the present invention, there is provided a liquid crystal device, comprising: a pair of substrates each provided with a transparent electrode and an alignment film subjected to a uniaxial aligning treatment, and a layer of chiral smectic liquid crystal disposed between the pair of substrates; wherein the liquid crystal layer is divided into a plurality of regions which are characterized by different rising directions of pretilt angle θp and provide smectic layers having normals parallel to each other, and the pretilt angle θp satisfies θp>(H)−δ and θp>δ, wherein (H) denotes a cone angle of the liquid crystal and δ denotes an angle of inclination of a smectic layer with respect to a substrate surface. It is further preferred that the pair of substrates are subjected to uniaxial aligning treatments in mutually different directions, and the smectic layers are aligned so that a normal thereto provides a projection onto the substrates which forms an angle in the range of −15 degrees to +15 degrees with respect to the directions of the uniaxial aligning treatments. The angle may preferably be at least 2 degrees as an absolute value.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 2A–2C are schematic plan views for illustrating rubbing directions in an embodiment of the present invention.

FIGS. 3A–3D are illustrations of intersecting rubbing directions adopted in an embodiment of the present invention.

FIGS. 7A–7D illustrate liquid crystal molecular movement along a liquid crystal panel.

FIGS. 8A and 8B illustrate FLC pretilt angles.

DETAILED DESCRIPTION OF THE INVENTION

Figure 1:
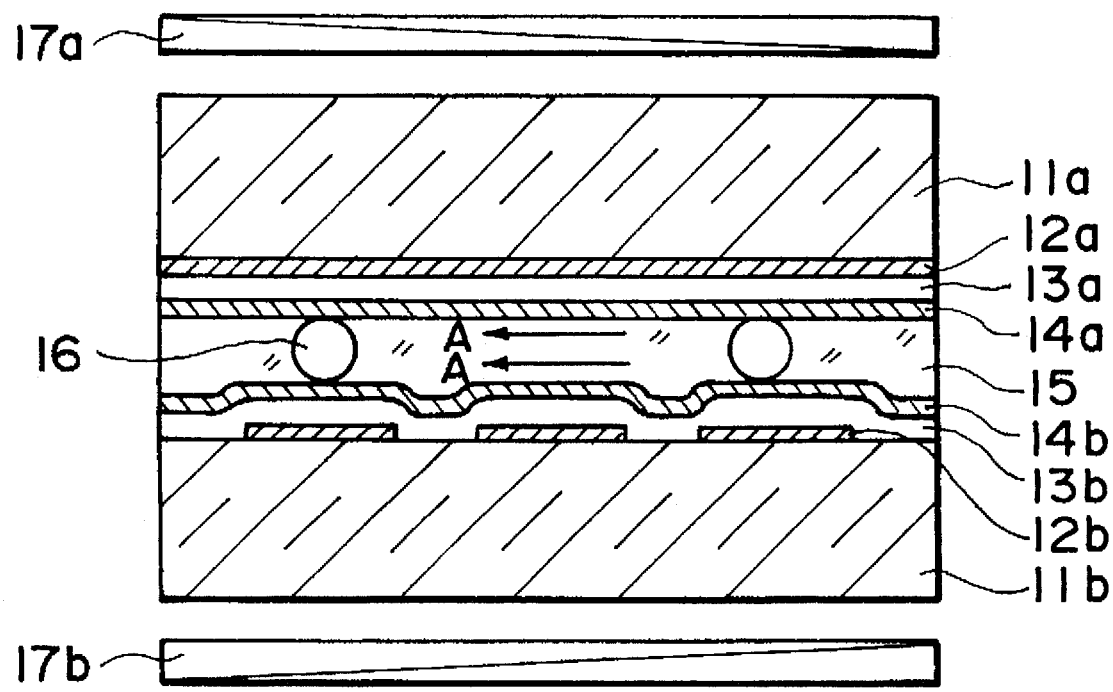
FIG. 1 is a schematic sectional view of an embodiment of the liquid crystal device according to the present invention.

Regarding the second aspect of the present invention, the above-mentioned molecular movement deeply depends on the angle that liquid crystal molecular long axes form with respect to the substrate surface (tilt angle). In case where the rubbing directions intersect each other at a certain angle, smectic layers are aligned so that their normal extends in a direction which is substantially in the middle of the two rubbing directions. Accordingly, the direction of the liquid crystal movement is determined based on the direction in which the pretilt angle is formed (or rises) in a smectic layer.

Referring again to FIG. 7A, in case where the rubbing is effected in directions as shown, the pretilt angle θp is formed so that the liquid crystal molecules 82 raise their head in the rubbing direction R with respect the rubbed alignment film 81 surface on both substrates 80 (as shown in FIG. 8A). In such a case, if the liquid crystal molecules are uniformly placed in the +θ position, the liquid crystal is liable to move in a direction of from the point A toward the point B as has been already described above and, if the pretilt angle is formed in the opposite direction (as shown in FIG. 8B), the liquid crystal is liable to move in the reverse direction (from the point B toward the point A). FIGS. 8A and 8B illustrate the formation of a tilt angle θp formed by a liquid crystal molecule 82 in relation with a direction R of rubbing an alignment film 81 on glass plate 80.

We have also discovered that, in case where pretilt occur in reverse directions in adjacent regions, a defect line is liable to occur at the boundary therebetween and the phenomenon depends on the chevron structure of the liquid crystal so that a severer defect is caused when the layer inclination angle δ with respect to the substrate surface is larger. It has been also found that the defect line functions as a resistance to the liquid crystal movement and the suppress the liquid crystal movement. From these facts, it has been found possible to control the number of defects by setting a number of regions distinguishable by rising directions of pretilt and control the intensity of the defects by setting the magnitude of the layer inclination angle δ, thereby controlling the liquid crystal movement.

Even if the pretilt rising directions are mutually opposite, the projections of the liquid crystal molecular long axes onto the substrate surface are identical, so that the display state is not adversely affected thereby but rather the viewing angle characteristic is averaged and rather improved.

Regarding to the first aspect of the present invention will be described. FIG. 1 is a schematic sectional view of an embodiment of the liquid crystal device (cell) according to the present invention.

Referring to FIG. 1, the liquid crystal cell includes a pair of an upper substrate 11a and a lower substrate 11b disposed in parallel with each other and provided with transparent electrodes 12a and 12b, respectively. On the transparent electrodes 12a and 12b are respectively formed, e.g., 200–1500Å-thick insulating films 13a and 13b (of, e.g., SiO$_2$, TiO$_2$, Ta$_2$O$_5$, etc.) and 50–1000Å-thick alignment control layers (films) 14a and 14b.

In the present invention, at least one of the alignment films 14a and 14b is subjected to uniaxial aligning treatments by rubbing in two different directions so that the lost rubbing directions on the two alignment films are in substantially parallel in the same direction (as shown by arrows A in FIG. 1) with the proviso that the last rubbing directions can have an intersection angle in the range of about 10 degrees.

Between the alignment films 14a and 14b is disposed a ferroelectric chiral smectic liquid crystal 15 in a layer thin (e.g., 0.1–3 µm) enough to suppress the formation of a helical structure of the chiral smectic liquid crystal 15 and provide a bistable alignment state of the liquid crystal 15. The liquid crystal layer thickness is held by spacer beads 16 of, e.g., silica or alumina disposed between the alignment films 14a and 14b. The liquid crystal cell structure thus formed is held between a pair of cross nicol polarizers 17a and 17b.

The alignment films 14a and 14b may comprise various polymer materials, and ordinarily polyimide, polyamide, polyamideimide, etc.

An alignment film may be rubbed by causing a cloth of nylon, etc., wound about a rubbing roller and rotated in one direction to contact the alignment film, thereby effecting a first uniaxial aligning treatment in one direction. The alignment film is then subjected to a similar second uniaxial aligning treatment in a direction different from the first uniaxial aligning treatment direction and can optionally be subjected to a further uniaxial aligning treatment in another direction.

Figure 6A:
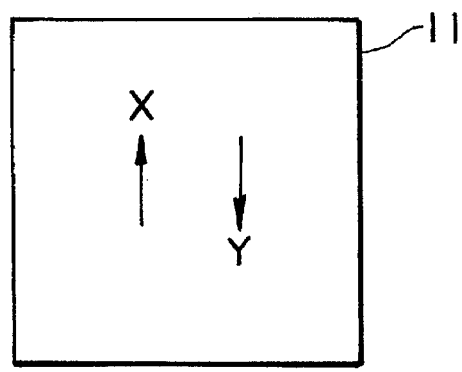
FIGS. 6A and 6B are illustrations of rubbing directions in another embodiment of the present invention.

The rubbing directions applied to a substrate 11 may preferably be mutually opposite two directions as shown in FIG. 6A. The rubbing intensities in the respective directions may be determined in consideration of balance between the respective direction and the intensity so as to finally obtain a desired alignment state.

In the case of rubbing in two or more different directions, a first rubbing treatment causes a certain extent of molecular alignment of the alignment film material per se and provides a power of uniaxially aligning liquid crystal molecules so as to develop a pretilt angle corresponding thereto. In this stage, however, it is difficult to accurately control the molecular order since the treatment is accompanied with a large change from a random molecular state formed by application of the alignment film material. However, if the alignment film already provided with a certain molecular order by the first rubbing treatment is subjected to a second rubbing treatment in a different direction, a further increased molecular order is provided to form a uniform state over a large area. Further, the uniformity of the pretilt angle is also increased as the development thereof is related with the molecular order of the alignment film. A plurality or rubbing treatments in identical directions causes an effect similar to the increase in rubbing intensity so that some difficulty may be encountered, particularly in adjustment of a pretilt angle, etc., so that the rubbing is effected in two different directions. However, a plurality of rubbing treatments in parallel directions are advantageous In respect of a uniaxial alignment characteristic. Accordingly, rubbing treatments in mutually opposite directions in an identical uniaxial direction may be preferred in view of both the uniaxial alignment characteristic and the pretilt angle characteristic. The pretilt angle rising direction has been known to be identical to the final rubbing direction and can be controlled as such.

An increased effect is attained by an increased number of rubbing treatments, but the increase in effect is gradually diminished, so that about two times are preferred in view of the productivity.

The alignment films 14a and 14b used in the present invention may have a thickness of 30Å–10 µm, preferably 200Å–2000Å, in case of functioning also as an insulating film and may have a thickness of 200Å or less, preferably 100Å or less in case of being used in combination with the insulating films 13a and 13b.

Hereinbelow, the present invention is described based on preferred embodiments.

(Example 1)

FIGS. 2a and 2B illustrate rubbing directions applied onto electrode substrates 21 and 22. Each substrate is divided into 5 regions so that the rubbing direction is reversed in respective regions. Further, a pair of substrates are provided with rubbing directions which cross each other when the substrates are superposed with each other (FIG. 2C).

More specifically, each substrate is provided with a rubbing direction which inclines leftward (+) or rightward (−) with respect to a normal to the resultant smectic layers as shown in FIG. 3A. The crossing of the rubbing directions applied onto a pair of substrates may be in two ways, i.e., a (+) cross relationship wherein a leftward (+) inclination onto a farther substrate and rightward (−) inclination onto a nearer substrate are combined at corresponding regions on the substrates as shown in FIG. 3C, and a (−) cross relationship wherein a rightward (−) inclination onto a farther substrate and a leftward (+) inclination onto a nearer substrate are combined as shown in FIG. 3D, in contrast with a mutually parallel relationship providing a crossing angle of 0 degree as shown in FIG. 3B as proposed hereinbefore. The crossing angle may preferably be 4 degrees to 30 degrees, more preferably 4 degrees to 15 degrees, in terms of an absolute value.

In order to effect such locally selective rubbing, each substrate may for example be regionally covered with a hard mask of, e.g., a 100 µm-thick stainless steel plate. The stainless steel plate is regionally selectively provided with openings, at which the substrate can be selectively rubbed. Alternatively, a wholly rubbed substrate may be covered with a photoresist, followed by U.V. exposure and regionally selective provision of openings. Thereafter, the exposed parts of the substrate are rubbed in specified directions different from the previous rubbing direction and then the remaining resist is wholly removed.

In a specific example according to this embodiment, each of the substrates 21 and 22 was composed of a 75 mm-square glass plate and provided with about 1000Å-thick ITO stripe electrodes coated with an about 500Å-thick sputtered $Ta_2O_5$ film and an about 300Å-thick fluorine-containing polyimide alignment film.

The respective substrates 21 and 22 were provided with rubbing directions as shown in FIGS. 2A and 2B so that their rubbing directions alternate at respective regions and applied to each other to form a cell so that the rubbing directions at corresponding regions on the substrates 21 and 22 formed a (−) cross angle of 8 degrees as shown in FIG. 2C.

Then, the cell was filled with an FLC having the properties as shown below at 30° C.:

Pretilt angle $\theta p=20$ degrees
$Ps=5.8$ $nC/cm^2$
Ⓗ tilt angle=14.3 degrees
Layer inclination angle $\delta=10.7$ degrees
Phase transition temperatures:

$$\text{Iso.} \xrightarrow{85.1°\,C.} \text{Ch.} \xrightarrow{78.7°\,C.} \text{SmA} \xrightarrow{55.4°\,C.} \text{SmC*}$$

The liquid crystal layer thickness (cell thickness) was regulated at about 1.1 µm.

In the resultant liquid crystal cell, at boundaries (e.g., one denoted by "A" in FIG. 2C), defect lines each in a width of about 1–3 µm extended from one side to the other side of the cell in the direction of projection of the layer normal onto the substrate.

The liquid crystal molecular movement in the cell along the layer extension was examined as a cell thickness change at distant points A and B close to the respective ends in the layer direction as shown at FIGS. 7A and 7B before and after application of rectangular pulses of ±15 volts and 10 Hz for 25 hours at room temperature. Further, whether a void part E as shown in FIG. 7B was formed or not, was examined.

The results of the above test are shown in the following Table 1 together with those obtained by using a comparative cell which was prepared in the same manner as above except that the opposite substrates were uniformly rubbed in parallel in the same direction.

TABLE 1

| Cell | Point A | Point B | Void E |
| --- | --- | --- | --- |
| Comparative | −0.08 μm | +0.13 μm | occurred |
| Example 1 | −0.01 μm | +0.0 μm | none |

As shown in the above Table 1, the liquid crystal movement occurred from point A to point B and voids like one shown at E in FIG. 7B occurred in the comparative cell but, in the cell of Example 1, substantial liquid crystal movement did not occur nor did voids occur as shown at E in FIG. 7B.

(Example 2)

A cell was prepared in the same manner as in Example 1 except that the pretilt angle θp was set to 13 degrees. Better results were observed than in the comparative cell wherein both substrates were uniformly rubbed in parallel in the same direction. The defects along the boundaries between the regions of different rubbing directions were somewhat narrower than in Example 1, but substantially no liquid crystal movement or void like one at part E was formed.

(Example 3)

Figure 4A:
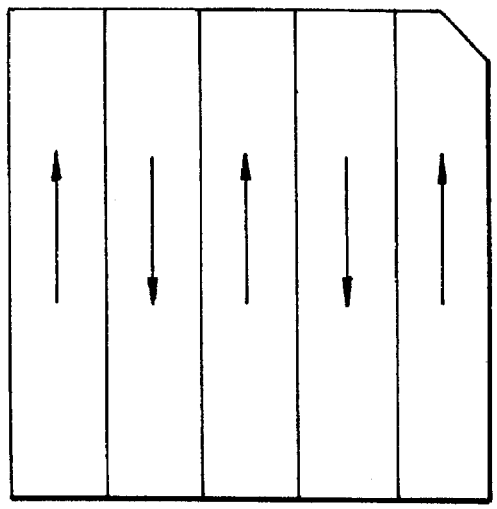
FIGS. 4A–4C are illustrations of rubbing directions in an embodiment of the present invention.
Figure 4B:
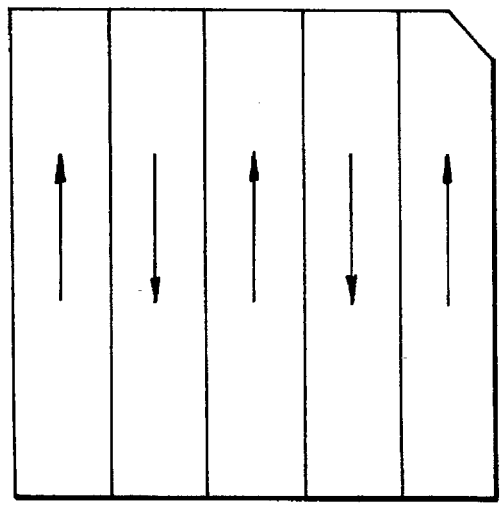
Figure 4C:
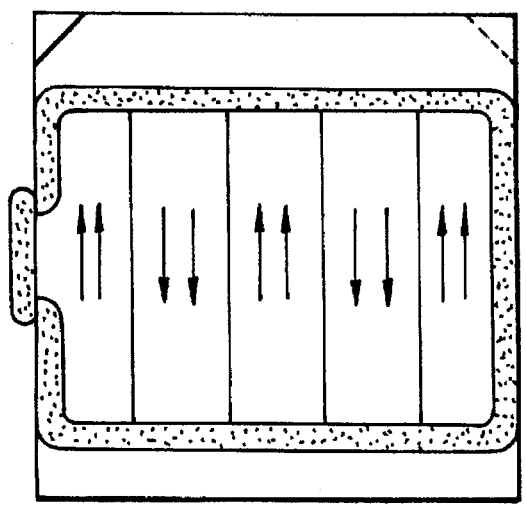
Figure 5:
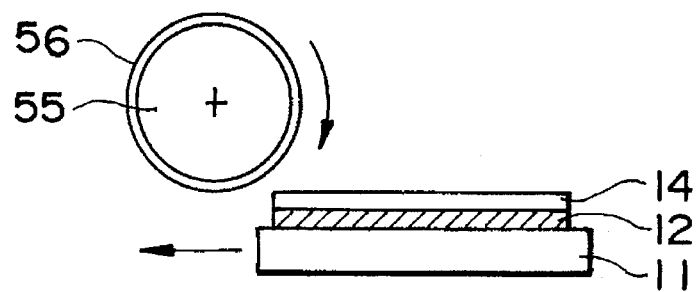
FIG. 5 is an illustration of a manner of rubbing treatment.

A cell was prepared in the same manner as in Example 1 except that the rubbing direction was alternated so that the rubbing direction formed 0 degree with respect to the layer normal direction (FIGS. 4A–4C).

Figure 10:
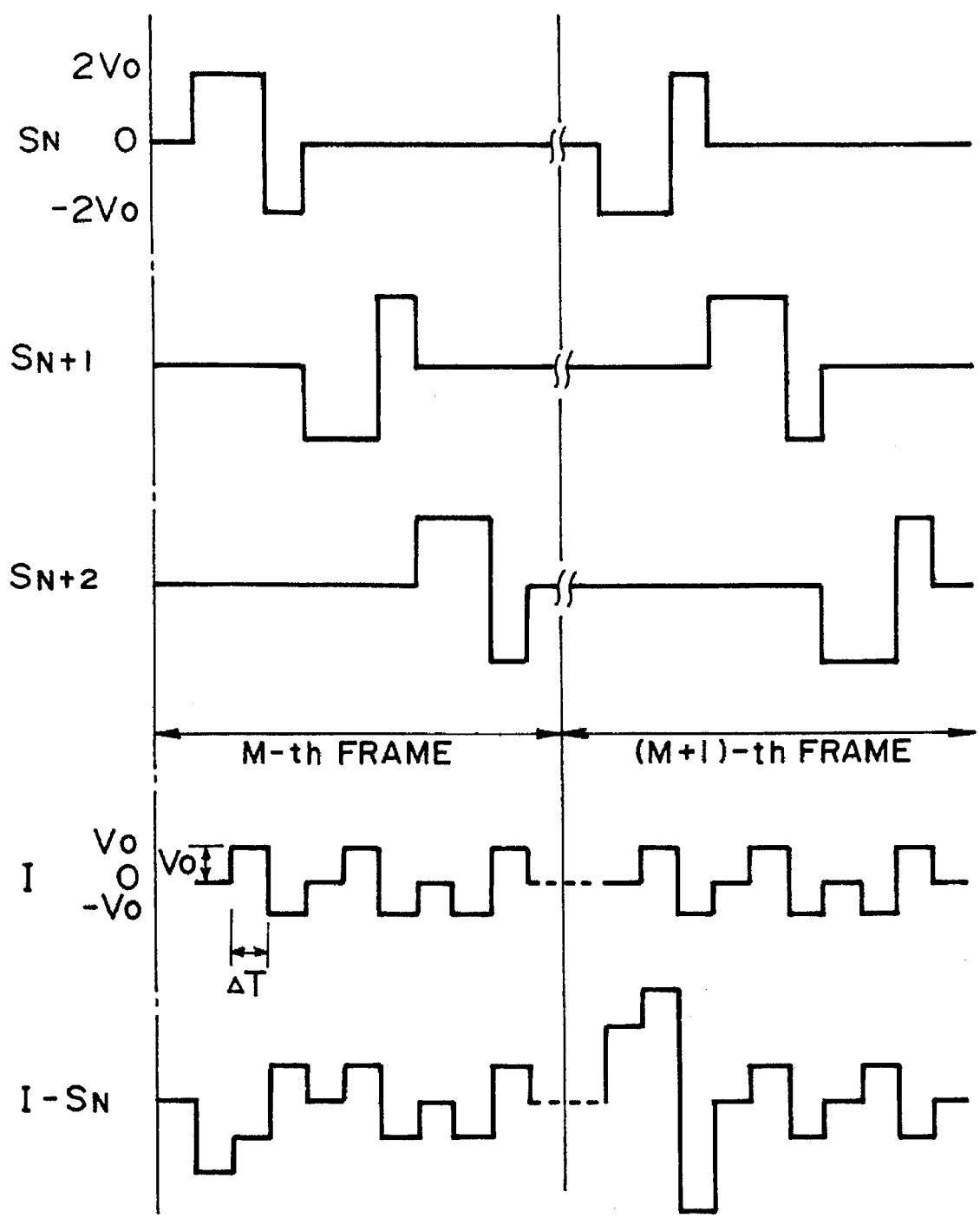
FIG. 10 is a waveform diagram illustrating driving waveforms used in an embodiment of the present invention.

As a result of the evaluation in the same manner as in Example 1, the resultant cell caused substantially no liquid crystal movement or void like part E. However, as a result of drive under application of a set of drive signals as shown in FIG. 10, the drive voltage margin allowing writing on the entire area was somewhat narrower than in Example 1.

(Example 4)

An FLC used in this embodiment may preferably be one showing a phase transition from isotropic phase through cholesteric phase and smectic A phase into chiral smectic C phase in the course of temperature decrease. Particularly, a chiral smectic liquid crystal showing a helical pitch of 0.8 microns or longer in cholesteric phase (measured at a mid temperature in the chotesteric range). Preferred examples of such a liquid crystal material mat include liquid crystal materials (1)–(5) below comprising the following liquid crystals "LC-1", "80B" and "80SI*" in the indicated proportions by weight.

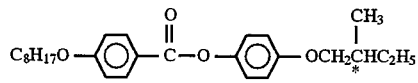

LC-1

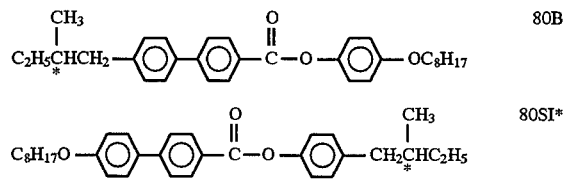

Liquid Crystal Material (1) (LC-1)$_{90}$/(80B)$_{10}$
(2) (LC-1)$_{80}$/(80B)$_{20}$
(3) (LC-1)$_{70}$/(80B)$_{30}$
(4) (LC-1)$_{60}$/(80B)$_{40}$
(5) (80SI*)$_{100}$ In a specific example according to this embodiment, two 1.1 mm-thick glass plates each provided with 1000Å-thick glass ITO films were respectively coated with a fluorine-containing polyimide precursor by spin coating, followed by baking at 270° C. for 1 hour, to form a 250Å-thick alignment film.

Each alignment film 14 coating ITO films 12 on a substrate 11 was rubbed in one direction (X-direction in FIG. 8A) with a nylon yarn-planted cloth 56 wound about a rubbing roller. Then, the same substrate 11 was reversed and rubbed in a second direction (Y-direction in FIG. 6A).

The molecular alignment characteristic of the to alignment film subjected to the rubbing in two different directions was examined by a high-sensitivity birefringence meter (available from Ohk Seisakusho K.K.) to measure a minute birefringence phase difference Δnd–1.1 nm with little axial fluctuation.

Then, the two substrates treated in the above-described manner were applied with each other after dispersing alumina beads of about 1.5 μm in average diameter on one substrate so that their second rubbing directions were parallel in the same direction, thereby forming a cell.

It was confirmed that the cell construction provided a pretilt angle of about 13 degrees at a level identical to that obtained by a single rubbing in one direction.

The cell was filled with an FLC ("CS-1014") (trade name) available from Chisso K.K.) in isotropic phase and gradually cooled to 30° C. at a rate of 0.5° C./hr to effect alignment. The FLC ("CS-1014") showed the following phase transition series in the cell.

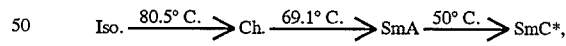

Iso: isotropic phase, Ch: cholesteric phase, SmA: smectic A phase, and SmC*: chiral smectic C phase.

The liquid crystal cell thus obtained was sandwiched between a pair of 90 degrees cross nicol polarizers and driven, whereby a high-contrast and high-quality display free from alignment defects was uniformly attained.

(Example 5)

Figure 6B:
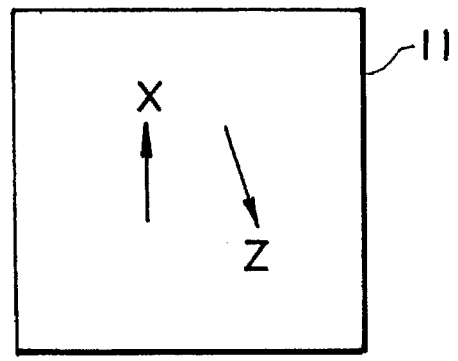
Figure 9A:
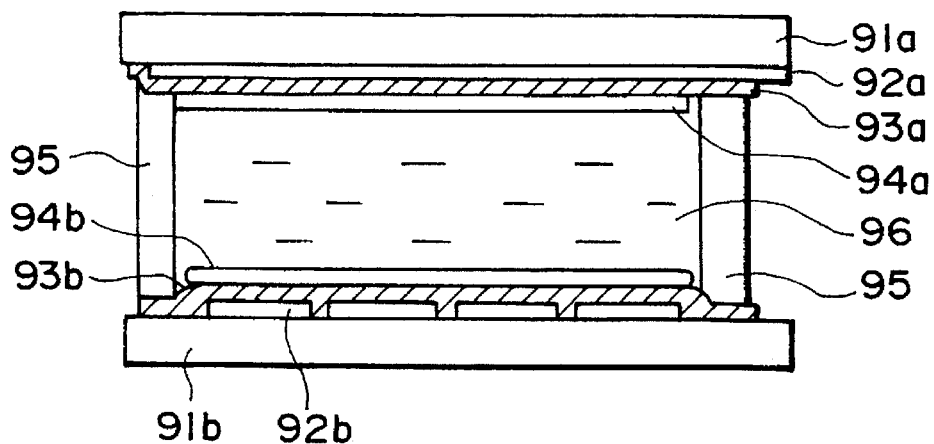
FIG. 9A is a schematic sectional view of a liquid crystal cell structure applicable to the present invention.
Figure 9B:
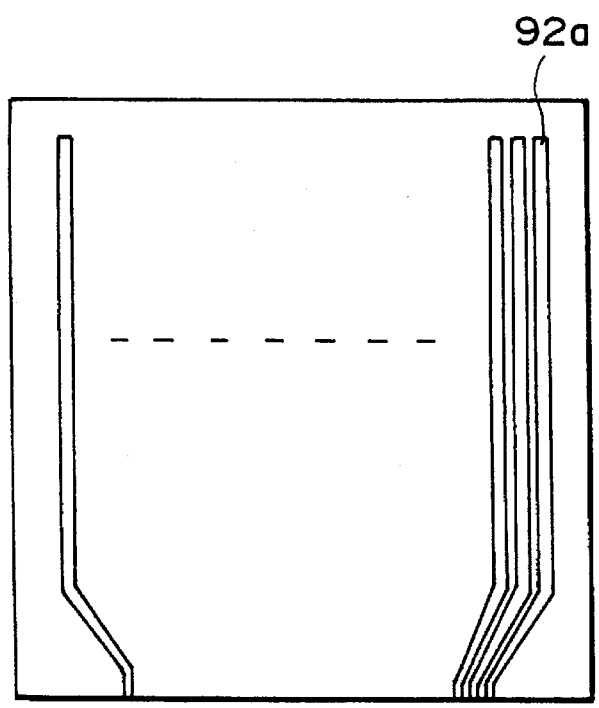
FIG. 9B is a schematic plan view of a stripe electrode arrangement on a substrate therein.

A liquid crystal cell was prepared in the same manner as in Example 4 except that the second rubbing direction on each substrate was changed to one (Z-direction in FIG. 6B) which was generally opposite to but inclined at an angle of 10 degrees from the first rubbing direction (X in FIG. 6B).

As a result of the same test as in Example 1, the thus treated alignment film showed Δnd=1.0 nm with little axial fluctuation. The liquid crystal cell provided a pretilt angle of about 12 degrees at a level identical to that obtained by a single rubbing in one direction.

As a result of drive in the same manner as in Example 4, the liquid crystal cell provided uniformly good display quality.

Comparative Example 1

A liquid crystal cell was prepared in the same manner as in Example 4 except that the second rubbing was omitted for the respective substrates.

As a result of the same test as in Example 4, the alignment film showed Δnd=0.8 nm with some axial fluctuation. The pretilt angle was at a level of about 12 degrees.

As a result of drive in the same manner as in Example 4, the liquid crystal cell provided a display quality accompanied with locally poor alignment due to irregularity of rubbing.

As described above, according to the present invention, it has become possible to solve the decrease in durability of a liquid crystal cell due to liquid crystal molecular movement by controlling the direction and magnitude of pretilt angle (i.e., an angle formed by liquid crystal molecules close to the substrate with respect to the substrate surface within the liquid crystal cell, thereby providing an improved display quality. Further, it has become possible to obtain an alignment with uniform uniaxial alignment characteristic and pretilt angle at a good reproducibility over a large area, thus providing an improved display quality. As a result, a liquid crystal display apparatus capable of high quality display on a large picture area can be realized.

What is claimed is:

1. A liquid crystal device, comprising: a pair of substrates disposed in parallel and each provided with a transparent electrode, and a chiral smectic liquid crystal layer disposed between the pair of substrates so as to form smectic layers providing a smectic layer normal; wherein at least one of the substrates is provided with a uniaxial alignment control film which has been divided into a plurality of regions subjected to uniaxial aligning treatment in at least two different directions so that the direction of the uniaxial aligning treatment in each region is deviated at an angle from a projection of the smectic layer normal onto the substrate.

2. A liquid crystal device according to claim 1, wherein liquid crystal molecules form a pretilt angle of at least 5 degrees with respect to the alignment control film.

3. A liquid crystal device according to claim 1, wherein the uniaxial aligning treatment is rubbing.

4. A liquid crystal device according to claim 1, wherein the liquid crystal layer is divided into a plurality of regions which are characterized by different rising directions of pretilt angle θp and provide smectic layers having normals parallel to each other, and the pretilt angle θp satisfies θp>(H)−δ and θp>δ, wherein (H) denotes a cone angle of the liquid crystal and δ denotes an angle of inclination of a smectic layer with respect to a substrate surface.

5. A liquid crystal device according to claim 1, wherein the pair of substrates are subjected to uniaxial aligning treatments in different directions in plural regions so that the directions of the uniaxial aligning treatment on the substrates in each region cross each other and are deviated from a projection of the smectic layer normal at an angle within the range of −15 degrees to +15 degrees.

* * * * *

UNITED STATES PATENT AND TRADEMARK OFFICE
CERTIFICATE OF CORRECTION

PATENT NO. : 5,633,740

DATED : May 27, 1997

INVENTORS : Masanobu Asaoka et al.

It is certified that error appears in the above-identified patent and that said Letters Patent is hereby corrected as shown below:

ON TITLE PAGE

[56] References Cited, under FOREIGN PATENT DOCUMENTS:

"4247429" should read --4-247429--.

[57] ABSTRACT

Line 6, "have" should read --has--.

COLUMN 2

Line 11, "exist" should read --exists--;
Line 28, "velds along the side D" should read --voids along side B--;
Line 63, "stale" should read --stable--.

COLUMN 3

Line 5, "have" should read --has--.

COLUMN 4

Line 12, "respect" should read --respect to--;
Lines 30-31, "as a resistance to the liquid crystal movement and the" should read --to resist and--;

UNITED STATES PATENT AND TRADEMARK OFFICE
CERTIFICATE OF CORRECTION

PATENT NO. : 5,633,740

DATED : May 27, 1997

INVENTORS : Masanobu Asaoka et al.

It is certified that error appears in the above-identified patent and that said Letters Patent is hereby corrected as shown below:

Column 4 continued

Line 43,   "Regarding to the" should read --The--;
   Line 44,   "be" should read --now be--;
   Line 57,   "lost" should read --last--.

COLUMN 5

Line 47,   "In" should read --in--.

COLUMN 7

Line 30,   "call" should read --cell--;
   Line 59,   "mat" should read --may--.

COLUMN 8

Line 26,   "8A)" should read --6A)--;
   Line 29,   "to" should be deleted;

UNITED STATES PATENT AND TRADEMARK OFFICE
CERTIFICATE OF CORRECTION

PATENT NO. : 5,633,740

DATED : May 27, 1997

INVENTORS : Masanobu Asaoka et al.

It is certified that error appears in the above-identified patent and that said Letters Patent is hereby corrected as shown below:

COLUMN 8 continued

Line 33, "$\Delta$nd-1.1nm" should read --$\Delta$nd=1.1nm--.

Signed and Sealed this

Thirtieth Day of December, 1997

*Attest:*

BRUCE LEHMAN

*Attesting Officer*   *Commissioner of Patents and Trademarks*